(12) United States Patent
Fields et al.

(10) Patent No.: US 6,224,805 B1
(45) Date of Patent: May 1, 2001

(54) PROCESS AND APPARATUS FOR FORMING PLASTIC SHEET

(75) Inventors: Steven David Fields, Yardley; James Ralph Galione, Bristol, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/183,985

(22) Filed: Nov. 2, 1998

(51) Int. Cl.[7] .................................................. B29C 49/00
(52) U.S. Cl. ................. 264/176.1; 264/165; 425/324.1; 425/325; 425/376.1; 425/380
(58) Field of Search ............................... 264/165, 176.1; 425/324.1, 325, 447, 376.1, 378.1, 380, 461

(56) References Cited

U.S. PATENT DOCUMENTS

| | | | |
|---|---|---|---|
| 1,631,805 | 6/1927 | Ferngren | 65/53 |
| 1,753,768 | 4/1930 | Blair | 65/195 |
| 1,772,448 | 8/1930 | Allen | 65/195 |
| 1,829,641 | 10/1931 | Ferngren | 65/195 |
| 1,836,394 | 12/1931 | Reece | 65/53 |
| 1,841,579 | 1/1932 | Fraser | 65/53 |
| 1,872,550 | 8/1932 | Allen | 65/195 |
| 1,891,371 | 12/1932 | Danner | 65/53 |
| 1,891,373 | 12/1932 | Danner | 65/92 |
| 3,149,949 | 9/1964 | Dockerty et al. | 65/53 |
| 3,451,798 | 6/1969 | Simon | 65/199 |
| 3,537,834 | 11/1970 | Simon | 65/199 |
| 4,384,015 | 5/1983 | Koepke et al. | . |
| 4,693,553 | * 9/1987 | Sasaki et al. | 350/96.34 |
| 4,696,779 | * 9/1987 | Wideman | 264/211.13 |
| 5,076,987 | 12/1991 | Wank et al. | 264/210.2 |
| 5,149,481 | 9/1992 | Gross et al. | 264/210.2 |
| 5,242,742 | 9/1993 | Funk et al. | 428/215 |
| 5,286,436 | 2/1994 | Funk et al. | 264/210.2 |
| 5,336,322 | * 8/1994 | Tobisawa et al. | 118/410 |
| 5,882,796 | * 3/1999 | Wilson et al. | 428/411.1 |
| 5,997,645 | * 12/1999 | Grimmel et al. | 118/410 |

FOREIGN PATENT DOCUMENTS 0 914 926 A2 * 12/1999 (EP) .
1087156 10/1967 (GB) .

OTHER PUBLICATIONS

Principles of Polymerization, 2nd Ed., George Odian, John Wiley & Sons, 1981, pp. 294–297.*

* cited by examiner

Primary Examiner—Jan H. Silbaugh
Assistant Examiner—Mark Eashoo
(74) Attorney, Agent, or Firm—S. Matthew Cairns; John L. Lemanowicz; Darryl P. Frickey

(57) ABSTRACT

Disclosed is a process and apparatus for formation of optical quality plastic sheet in a continuous fashion, wherein the plastic sheet produced is capable of use in a variety of optical and electronic display applications.

9 Claims, 5 Drawing Sheets

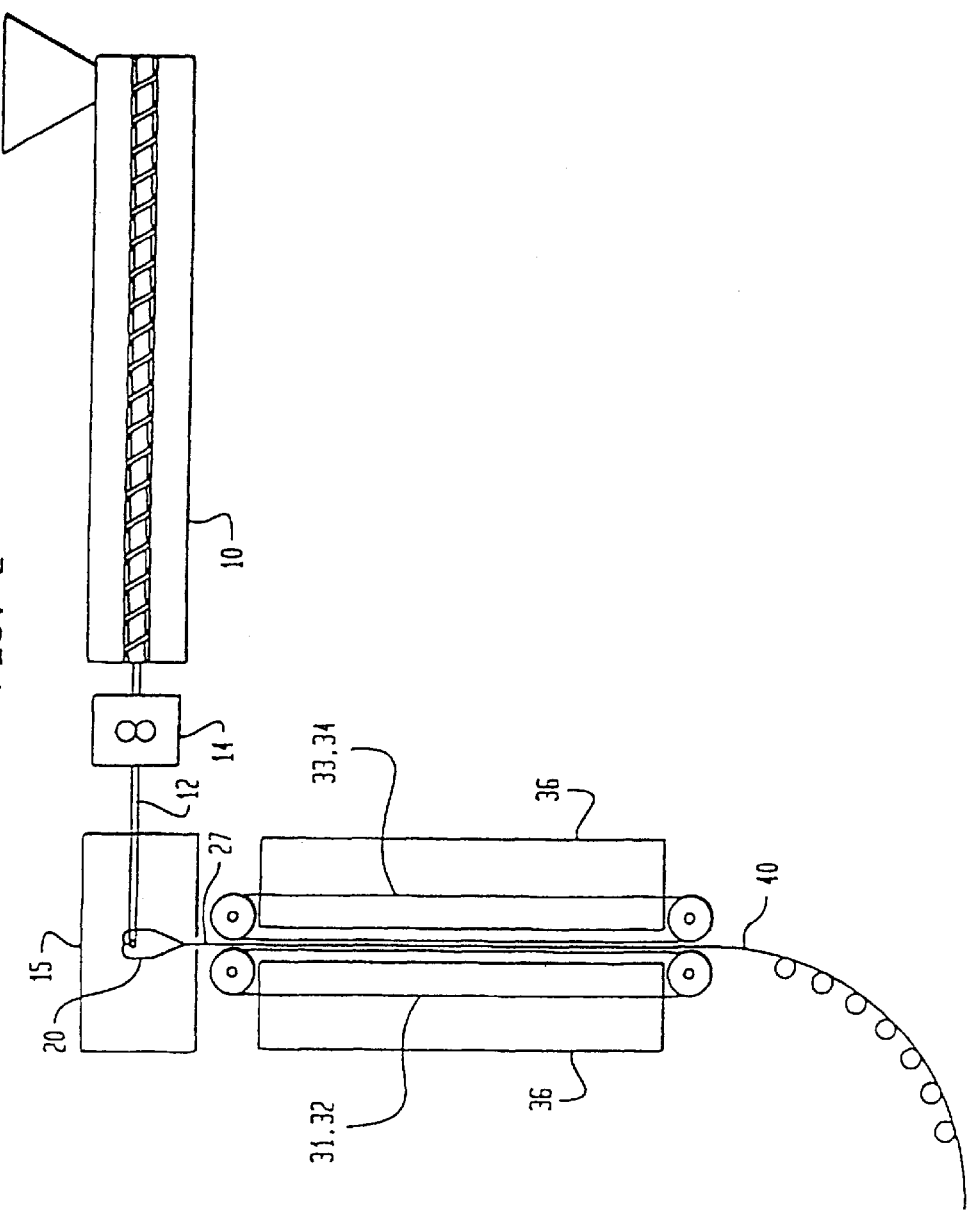
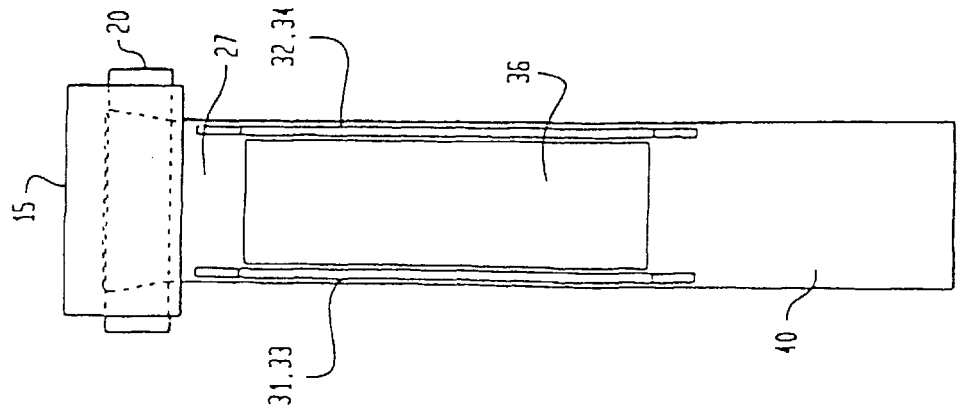

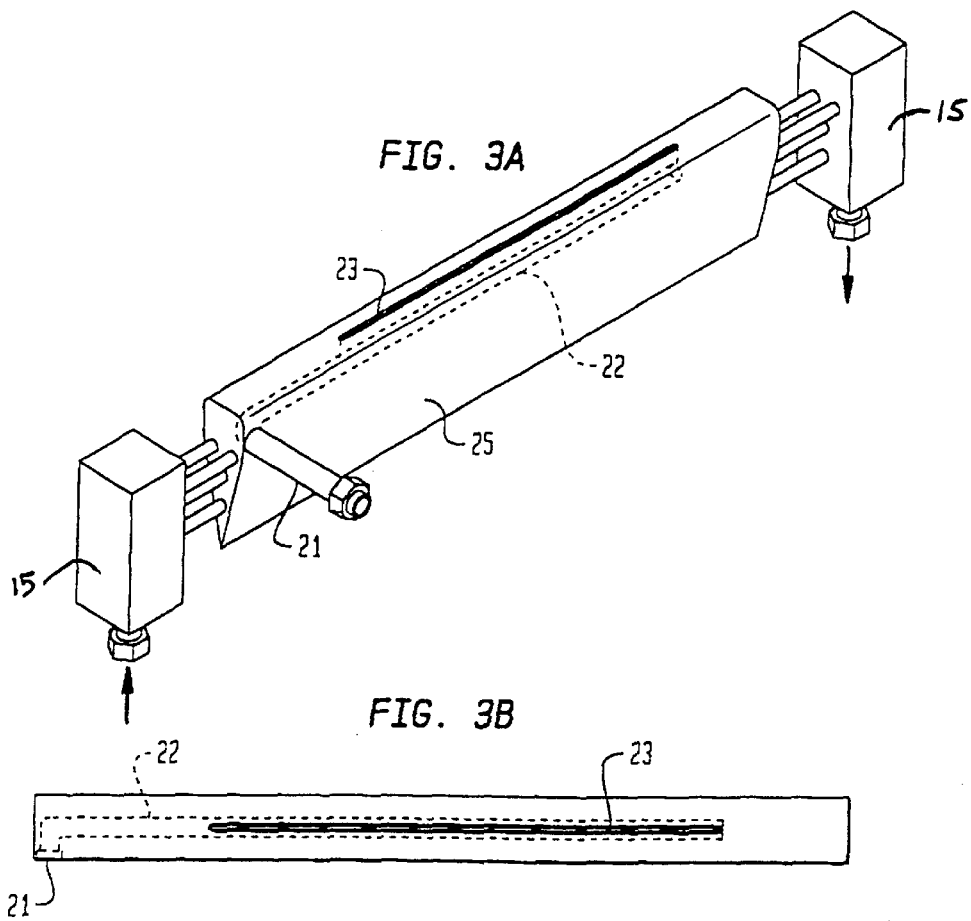
FIG. 3A
FIG. 3B
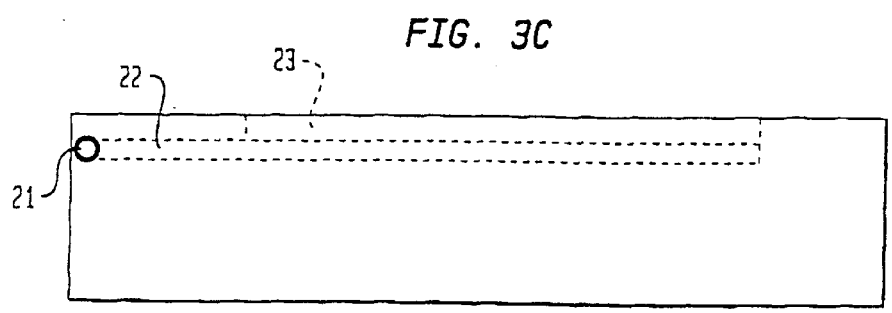
FIG. 3C
FIG. 4
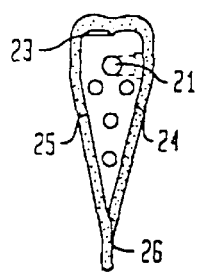

PROCESS AND APPARATUS FOR FORMING PLASTIC SHEET

BACKGROUND OF THE INVENTION

The present invention relates to a process and apparatus for forming plastic sheet. In particular, the present invention relates to a process and apparatus for forming plastic sheet having low residual stress and high surface quality. Plastic sheet formed according to the process of the present invention is particularly useful in optical and electronic display applications, such as, for example, optical windows, optical filters, recording media, and liquid crystal displays (LCD).

Sheets of optical quality glass or quartz are used in electronic display applications as "substrates." In such applications, a "substrate" is a sheet of material used to build an electronic display. Such substrates can be transparent, translucent or opaque, but are typically transparent. In general, such sheets have conductive coatings applied thereto prior to use as substrates. Such substrates often have stringent specifications for optical clarity, flatness and minimal birefringence, and typically must have high resistance to gas and solvent permeation. Mechanical properties such as flexibility, impact resistance, hardness and scratch resistance are also important considerations. Glass or quartz sheets have been used in display applications because these materials are able to meet the optical and flatness requirements and have good thermal and chemical resistance and barrier properties; however, these materials do not have some of the desired mechanical properties, most notably low density, flexibility and impact resistance.

Because of the mechanical limitations of glass or quartz sheet in optical or display applications, it is desirable to use plastic sheet in such applications. Although plastic sheets have greater flexibility, are more resistant to breakage, and are of lighter weight than glass or quartz sheets of equal thickness, it has been very difficult to produce plastic sheet having the requisite optical specifications needed for use in optical and display applications at reasonable costs. Moreover, many types of plastic sheet undergo unacceptable dimensional distortion when subjected to substrate processing conditions during manufacture of the display devices, particularly with respect to temperature.

There are several commercially utilized methods for producing plastic sheet, including casting, extrusion, molding, and stretching operations. Of these methods, several are not suitable for producing high quality plastic sheet. As used throughout this specification, the term "high quality" is used to describe plastic sheet having the following characteristics: low surface roughness, low waviness, low thickness variation, and minimal amount of polymer chain orientation (for example, as measured by asymmetric physical properties, birefringence or thermal shrinkage).

For example, injection molding is likely to produce high amounts of polymer chain orientation, especially for thin sheets (i.e., 1 mm thickness or less), due to the flow of molten plastic into the mold, which unacceptably increases birefringence for polymers with non-negligible photoelasticity coefficients. Injection compression molding is an improved molding process which allows squeezing of the polymer after injection for the purpose of improving surface quality and reducing polymer chain orientation. However, even with these improvements, injection compression molding has limited ability to produce high quality sheet.

Compression molding and press polishing may be used to produce sheets with good surface quality; however, the squeezing flow inherent in such processes results in polymer chain orientation which results in unacceptable shrinkage during thermal cycling. Moreover, these processes are not continuously operable and therefore increase labor and production costs.

Stretching operations (for example, for the production of uniaxially- or biaxially-oriented films) and blown film extrusion inherently introduce large amounts of polymer chain orientation and are unsuited for the production of high quality plastic sheet.

Solvent casting can be used to produce high quality film; however, there are practical limitations to the maximum film thickness which can be produced by this method. In addition, the solvent used in the casting must be removed after formation of the sheet.

Sheet extrusion is run as a continuous operation, but this process introduces unacceptable polymer chain orientation due to the nature of the polymer flow in the die and between the polished rollers in the roll stack.

There is therefore a continuing need for a method for producing relatively inexpensive, high quality plastic sheet in a continuous fashion, wherein the resultant plastic sheet is capable of use as a substrate in optical and electronic display applications.

STATEMENT OF THE INVENTION

The present invention is directed to a method for producing high quality plastic sheet, including the steps of: a) providing molten plastic resin; b) directing the molten plastic resin to an overflow die having an inlet and an outlet; c) shaping the molten plastic resin into a molten web using said overflow die; d) guiding said molten web away from said overflow die; and e) cooling said molten web to form a solid sheet.

The present invention is also directed to an apparatus for producing high quality plastic sheet, including: a) a source for providing molten plastic resin; b) an overflow die having a length and a width, comprising a substantially egg-shaped cross-section culminating in an apex, a conduit opening, and a metering arrangement connected with said conduit opening, wherein the molten plastic resin flows into the die through the conduit opening, out of the die through the metering arrangement, and around the sides of the die to form a molten web at said apex; c) means for delivering said molten plastic resin from said source to said overflow die; and d) guidance means for guiding said molten web away from said overflow die.

The present invention is also directed to an overflow die useful in forming high quality plastic sheet, said overflow die having an interior and an exterior and including: a) an overflow surface formed by the exterior of the die and comprising a pair of die lips; b) two exterior sides connected to said overflow surface; c) an apex formed by the confluence of said two exterior sides and located in substantial opposition to said overflow surface, wherein the die has a substantially egg-shaped cross-section; d) a conduit opening from the exterior to the interior, and e) a metering arrangement located in the interior, wherein such metering arrangement is connected with said conduit opening and said overflow surface.

BRIEF DESCRIPTION OF THE DRAWING

FIG. 1 is a frontal view of a typical apparatus of the present invention.

FIG. 2 is a side view of the apparatus of FIG. 1.

FIGS. 3A–3C are close-ups of overflow die 20. FIG. 3A is a perspective view of the die with heating manifold attached. FIG. 3B is a top view of the die; and FIG. 3C is a side view of the die.

FIG. 4 is a cross-sectional view of overflow die 20.

FIG. 5 illustrates an overflow die having a series of holes in place of the slot 22 of die 20; FIG. 6 illustrates an overflow die having a non-tapering slot; and FIG. 7 illustrates an overflow die having a "coathanger" arrangement.

DETAILED DESCRIPTION OF THE INVENTION

Figure 5A:
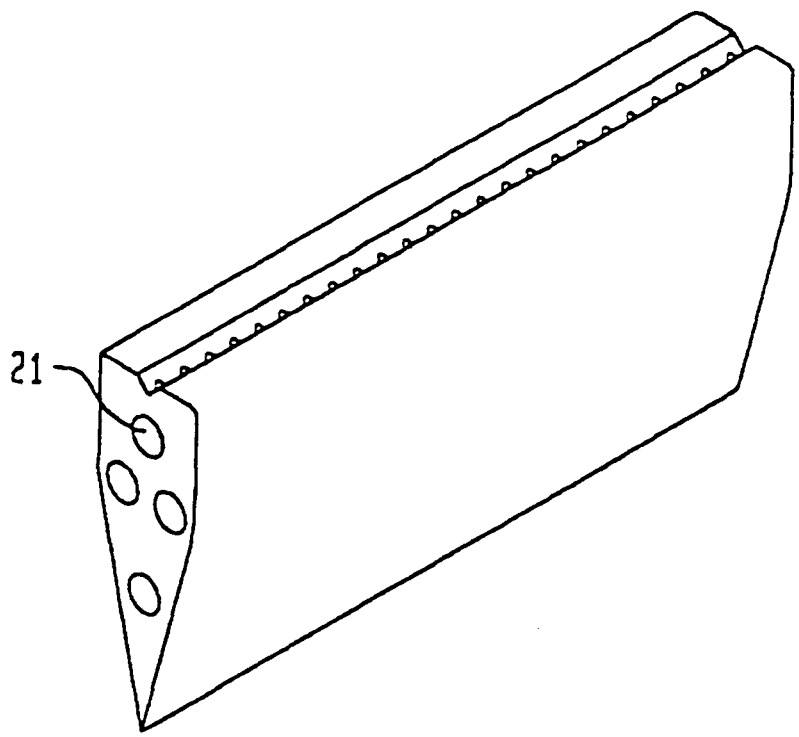
FIGS. 5–7 are alternate embodiments of the overflow die of the present invention.

As used in this specification, the following terms have the following definitions, unless the context clearly indicates otherwise. "Glass transition temperature" or "Tg" is the midpoint of the narrow temperature range over which polymers change from being relatively hard and brittle to relatively soft and viscous (rubbery). "Plastic" refers to polymer, such as thermoplastic polymers, which can form sheets. The terms "polymer" and "resin" are used interchangeably throughout the specification. "Sheet" refers to a sheet having a thickness of about 25 mm or less, and is intended to include "films" (sheets having thickness of <0.5 mm). "Shrinkage" refers to an irreversible dimensional change that occurs in a sheet subjected to a heat-cool cycle. The following abbreviations are used in the specification: cm=centimeter(s); mm=millimeter(s); nm=nanometer(s); $\mu$=micron(s) (micrometers); g=gram(s); mL=milliliters; Pa=Pascals; kPa=kiloPascals; Pa-s=Pascal-seconds; sec=second(s); min=minute(s); hrs=hour(s); UV=ultraviolet, and IR=infrared. All temperature references are ° C. unless otherwise specified. Ranges specified are to be read as inclusive, unless specifically identified otherwise.

The high quality plastic sheet formed by the process of the present invention can be used in a number of applications, including but not limited to: substrates for electronic display devices such as LCD and electroluminescent displays; optical windows and filters; substrates for optical, magnetic, chemical or other types of recording media; substrates for imaging, such as for photographic or x-ray applications. Depending on the particular use for sheet produced by the method of the present invention, sheet characteristics such as low shrinkage, low birefringence, and surface quality may vary in relative importance. Desired sheet thickness will also vary depending on the particular use, but will generally be about 25 mm or less, preferably 10–5000$\mu$, and most preferably 50–1000 $\mu$. Sheet thickness can be adjusted by varying the speed of delivery of the molten polymer to the die or by varying the speed of the take-off means. Thickness variation over a sample length of 400 mm should be generally 10% or less, preferably 5% or less, and most preferably 1% or less.

A typical apparatus of the present invention is shown in FIGS. 1–4. As will become clear to those skilled in the art, variations from the apparatus illustrated in these Figures may be made within the scope of the present invention.

Molten polymer from a source 10 is delivered to an overflow die 20 via channel 12 (preferably controlled by delivery means 14), where it is introduced to the die 20 through conduit opening 21 to conduit 22. The temperature of the molten polymer as it is delivered to die 20 is maintained by use of heaters 15 located in close proximity to die 20. As the molten polymer fills the opening 21, it is forced out through the metering arrangement, slot 23, onto the die lips 40 and 41, and flows out around the sides 24 and 25 of the die 20. At the apex 26 of the die 20, the molten polymer flowing from sides 24 and 25 converge to form the beginning of molten web 27.

The molten web 27 is picked up at its edges by two pairs of guidance means, (e.g., tank treads 31, 32, 33 and 34) which guide the molten web away from die 20. As molten web 27 is guided away from die 20, the temperature of the web gradually falls below the glass transition temperature of the polymer, and results in cooled sheet 40. In an optional embodiment, cooling means 36 located in close proximity to the guidance means 31, 32, 33, 34 aid in lowering the temperature of the web.

Molten resin can be supplied in any of a number of ways. For example, the molten resin may be supplied from a polymerization reactor, a mixer, a devolatilization device (e.g., a flash column, falling strand devolatilizer or wiped film evaporator), or an extruder. An extruder is preferred, as it can also act as a polymer delivery means (see discussion below). It is most preferred to use a single screw extruder, although a double (twin) screw extruder or a multiple screw extruder may also be used. If a twin or multiple screw extruder is used, it can be of any type, for example, counter-rotating, co-rotating, intermeshing or non-intermeshing.

The molten resin may contain one or more plastic additives such as antioxidants, ultra-violet ('UV') absorbers, UV stabilizers, fluorescent or absorbing dyes, anti-static additives, release agents, fillers and particulates. The type and amount of additive used with particular resins for particular purposes is known to those skilled in the plastic arts and will not be further detailed herein.

The temperature at which the resin is processed will depend upon the composition of the resin and may vary during processing. The temperature must be sufficiently high that the resin will flow but not so high as to degrade the resin. Operating conditions will vary depending on the type of polymer to be processed, and are within ranges known to those skilled in the art. However, as a general guideline, the operating temperature will be between 100 and 400° C. For example, PMMA may be processed in an extruder with the extruder barrel temperature of 150 to 260° C. and a melt temperature of 150 to 260° C. Other polymers such as polycarbonate or poly methylmethacrylimide can also be used at appropriately higher melt temperatures (200–330° C.). It is preferred that volatile materials and undesired particulate matter be removed from the molten plastic resin prior to sheet formation. This may be accomplished in accordance with methods known to those skilled in the art.

Delivery means 14 for delivering constant flow of the molten polymer are required for the purpose of regulating the flow rate and providing the pressure required to deliver the molten polymer through the channel 12, conduit opening 21 and conduit 22, to the die 20. The delivery means may include any type of mechanical melt pump, including, but not limited to any appropriate extruder (as described above), gear pump, or combinations thereof. In simple form, the delivery means may be a gravity feed, or hydrostatic pressure. The delivery means may be selected in accordance with methods known to those skilled in the art. The use of a gear-type melt pump is preferred because it provides control of flow rate and minimizes flow rate fluctuations, resulting in more uniform sheet thickness. In addition, the use of a melt pump may reduce degradation of the molten resin by reducing the shear heating of the polymer. Temperatures for the melt pump are determined by the plastic resin used, and are similar to those used in standard extrusion processes, typically between 50 and 200° C. above the Tg of the resin. More than one delivery means may be used, for example, for the production of wide sheets. In the present invention, the delivery means should provide molten polymer to the inlet of overflow die in the range of 50 to 70,000 kPa, preferably 300 to 7000 kPa, and most 1000 to 3500 kPa.

The overflow die is used to form a sheet from the molten plastic resin. The die includes a metering arrangement and an overflow surface with converging sides which in cross section culminate in an apex. The die in lengthwise fashion can be substantially linear, curved, oval or circular. The die height to width ratio should generally be in the range of 1:1 to 10:1, preferably 2:1 to 5:1, and most preferably 2.5:1 to 4:1. The length (or circumference) to height ratio should generally be at least 1:2, preferably at least 2:1, and most preferably at least 3:1.

Figure 5B:
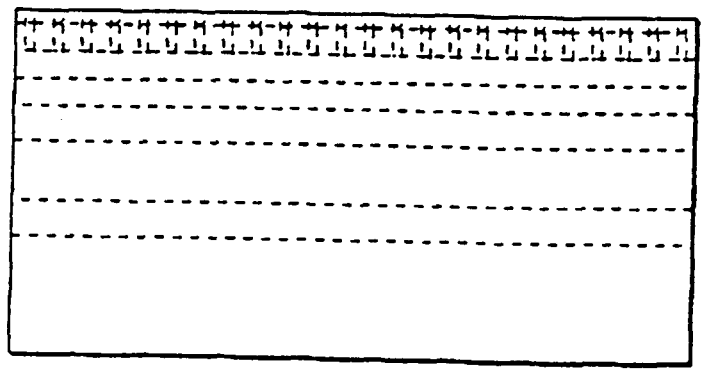
Figure 6A:
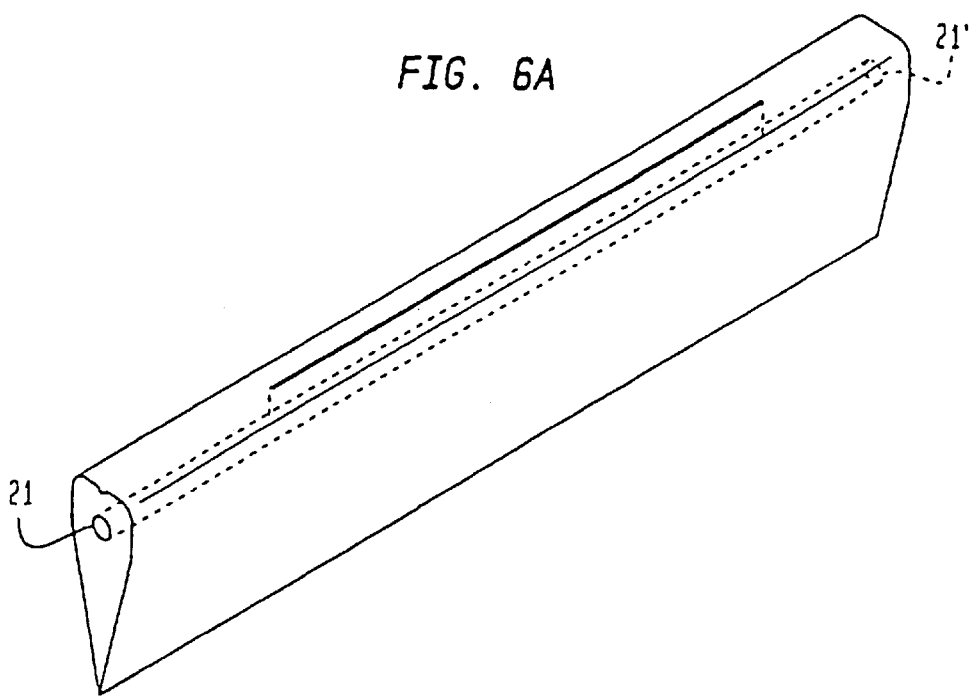
Figure 6B:
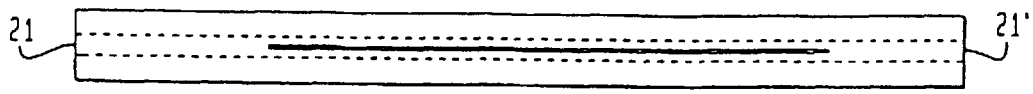
Figure 6C:
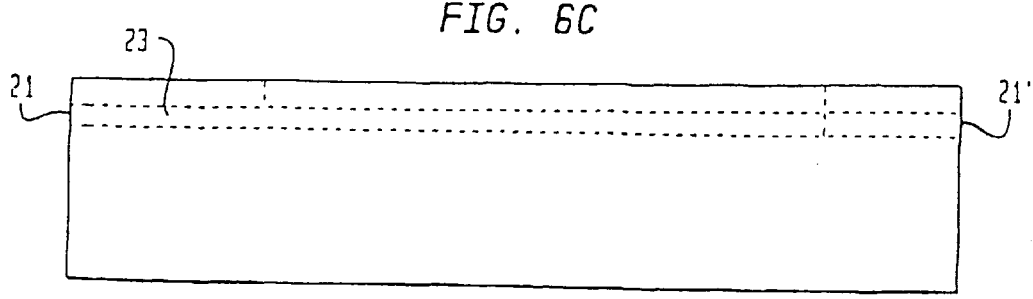
Figure 7A:
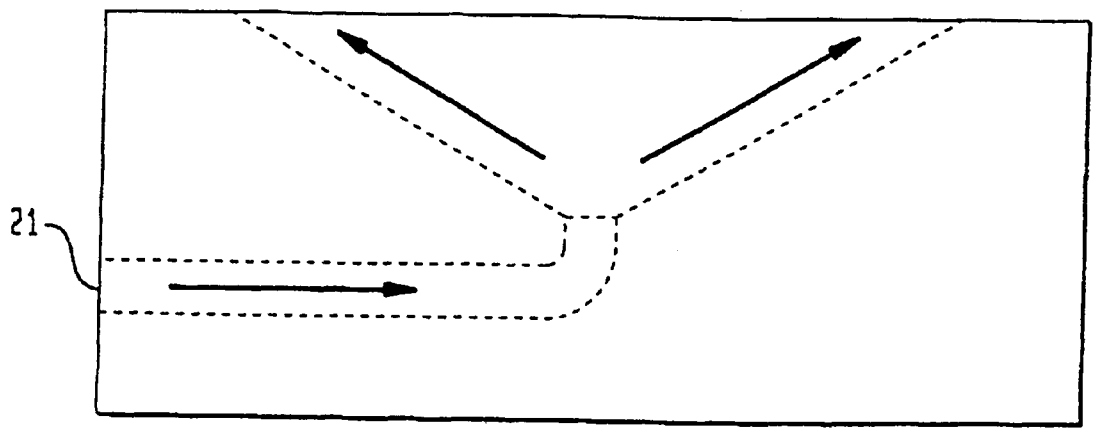
Figure 7B:
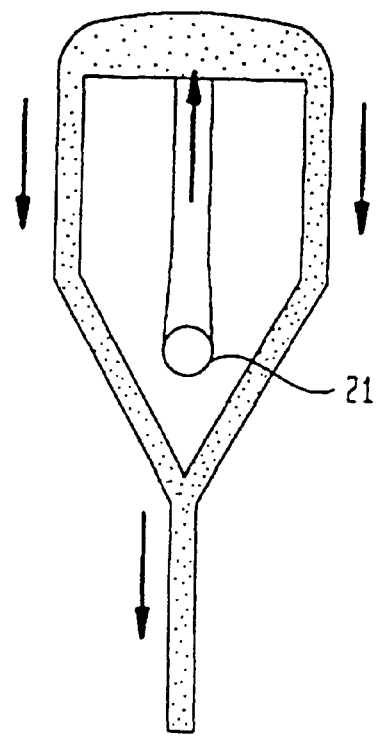

The metering arrangement portion of the overflow die consists of flow distribution elements such as, for example, holes, slot, "coathanger" arrangement or combinations thereof, which control the flow distribution of the molten resin across the die, thereby controlling the sheet thickness profile. Examples of such metering arrangements are illustrated in FIGS. 5–7. Other metering arrangements may be used as known to those skilled in the art. A slot arrangement is preferred. The length of the die will depend upon the width of the sheet to be made, but the ratio of the mean slot gap (mean width of the slot 23) to mean conduit diameter (mean diameter of the conduit 22) should generally be at least 1:5, preferably at least 1:10, and most preferably at least 1:20. For sheets having a finished thickness of 1 mm or less, a substantially constant slot width across the die is preferred. For greater thicknesses, a tapered slot is preferred wherein the slot is thinner at the feed end, and thicker at the opposing end. If a wide sheet is desired, conduit openings 21 and 21'(see FIG. 6) can be located at both ends of the die, and it is possible to have the slot 23 tapered at both ends.

The overflow surface is formed by the exterior of the die 20 and consists of a pair of die lips, 40 and 41, which connect with the metering arrangement and direct the molten polymer to the converging sides, 24 and 25. The converging sides direct the melt flow to the apex 26, where the melt web exits from the die. Although the overflow surface can be textured or smooth, it is preferably smooth. Moreover, the overflow surface is preferably highly polished to minimize variations and defects in the sheet. The overflow surface may be treated with a coating (for example, electroplating or other depositing techniques) to improve die surface smoothness, provide corrosion resistance, or improve the flow properties over the die.

The material of construction of the die is important. Metals are preferred due to their high thermal conductivity, good corrosion resistance, high modulus, and ability to be polished. However, other materials such as glass and ceramics can, in principle, be used. It is preferred to use stainless or tool grade steel.

If a non-planar sheet is desired, the die geometry may be modified accordingly, using methods known to those skilled in the art. For example, if a curved sheet is desired, the die can be curved along its longitudinal axis.

In general, it is desired to maintain the viscosity of the molten plastic (for a shear rate of 10 $\sec^{-1}$) between 10 and 100,000 poise, preferably between 50 and 10,000 poise, and most preferably between 100 and 5000 poise. In addition, the melt flow rate per unit die length (flow rate divided by the length) is typically in the range of $1.0 \times 10^{-3}$ to 10 g/s/cm, preferably $1.0 \times 10^{-2}$ to 1.0 g/s/cm, and most preferably $2.0 \times 10^{-2}$ to $2.0 \times 10^{-1}$ g/s/cm. The viscosity can be controlled by varying the temperature. Depending on the die design, the temperature control may be more or less important. The more even the temperature across the die, the more even the thickness of the sheet. Thickness variation resulting from uneven temperature distribution down the length of the die can be minimized by changing the design of the slot or other metering arrangement. Temperature control may be accomplished, for example, by one or more of the following: electric cartridge heaters, infrared lamp heaters, heated oil (or other heat transfer fluid), heat pipes, or microwave heaters. Heated oil or other heat transfer fluids are preferred because the temperature may be controlled by a thermostat and uniformity of temperature may be readily accomplished. The die is preferably housed within a partially enclosed area in order to minimize temperature fluctuations.

It is preferred, but not essential, that the molten plastic flows in a downward direction after passing over the die, since the downward flow is affected by gravity. The rate of flow is determined by a combination of the effect of gravity, and the tension applied by the takeoff means. By conducting the plastic flow in a downward direction over the die, gravity acts in the same direction as the sheet flow, thereby reducing the tension needed in the takeoff means and improving sheet quality. The molten plastic after passing through the die is in a form known as a "web."

The takeoff means transports the molten plastic web from the die at a controlled speed and allows the web to cool. The takeoff means may be, for example, rollers or a "tank tread" arrangement, whereby only the outer edges of the sheet come into contact with the takeoff means. A "tank tread" arrangement is preferred, as this maximizes the smoothness of the sheet surface. A tank tread arrangement is illustrated as part of the apparatus of FIGS. 1 and 2 as 31, 32, 33 and 34.

The takeoff means controls the speed at which the plastic sheet is produced, which at a given polymer flow rate determines the thickness of the sheet; therefore, control of the speed of the takeoff means is quite important. The takeoff means also supports the weight of the sheet, thereby maintaining consistent sheet width and thickness. It is desirable to position the takeoff means as close as possible to the die so that the amount of molten resin that is unsupported is minimized. The distance from the apex of the die to the takeoff system (e.g., the nip area at the top of the tank tread arrangement) is typically <25 cm, preferably <10 cm, and most preferably <5 cm.

The sheet takeoff speed will vary depending on the type of sheet desired, and the thickness. For example, for a sheet having 0.4 mm thickness, the sheet takeoff speed will generally be in the range of 10 to 1000 cm/min, preferably 20 to 200 cm/min, and most preferably 50 to 100 cm/min; whereas for a sheet having 1 mm thickness, the takeoff speed will generally be in the range of 5 to 500 cm/min, preferably 10 to 100 cm/min, and most preferably 25 to 50 cm/min. In like fashion, the residence time during cooling in the takeoff system before bending will vary. For example, for a sheet having 0.4 mm thickness, the residence time before bending will generally be $\geq 10$ sec, preferably $\geq 1$ min, and most preferably $\geq 2$ min; whereas for a sheet having 0.2 mm thickness, the residence time before bending will generally be $\geq 5$ sec, preferably $\geq 30$ sec, and most preferably $\geq 1$ min.

The plastic sheet may be allowed to cool by natural convection during transport by the takeoff system, or by forced convection. Natural convection consists of passive cooling of the sheet during passage through air or a fluid bath. Forced convection is accomplished by pumping or blowing a heat transfer fluid along or against the sheet to enhance heat transfer. Forced gas convection utilizing a blower and plenum arrangement is preferred for minimizing sheet ripples and surface marks. It is preferred to use a clean fluid (free from particulates) for cooling the sheet to prevent surface contamination or defects. For example, HEPA filters may be used with air or gas cooling for this purpose. Any fluid or combinations of fluids can be used for sheet cooling, provided that the fluid used is not detrimental to the plastic material being processed. Examples of useful cooling fluids are: air, nitrogen, water, oils, and glycols. It is possible to combine the cooling process with a coating process by using a suitable coolant which acts as a coating and is deposited as a film on the plastic sheet as it leaves the cooling bath.

It will be recognized by those skilled in the art that a variety of optional equipment may be used following the takeoff means. Examples of optional equipment include conventional film handling equipment such as film winders, edge cutters, sheet cutters, and packaging equipment. In addition, other downstream devices can be utilized, for example, forming equipment, coating equipment, decorating equipment, and laminating equipment.

The process of the present invention may be used with any suitable plastic resin, and is preferably used with thermoplastic resins. A thermoplastic resin is a polymeric resin which reversibly softens when exposed to heat and hardens upon cooling. Thermoplastic resins may be linear or branched polymers that are not substantially cross-linked. It is preferred that the thermoplastic resins useful in the process of the present invention have virtually no crosslinking and have thermal stability (for residence time of up to 10 min or more) at melt processing temperatures (i.e., having a viscosity on the order of $10^4$ poise). Examples of thermoplastic resins for which the process of the present invention is useful include but are not limited to: homopolymers or copolymers of acrylic acid, methacrylic acid and their esters, including but not limited to copolymers formed with styrene and its derivatives, N-alkyl maleimides, acrylonitrile, and vinyl acetate; phenoxy ethers; polyphenylene oxide resins, epoxy resins; cellulosic resins; vinyl polymers such as polyvinyl chloride ("PVC"); fluoropolymers such as fluorinated ethylene-propylene and poly(vinylidene fluoride); polycarbonates; polystyrenes; polyolefins such as polyethylene, polypropylene, poly-4-methylpentene-1, and including cyclic polyolefins; polysulfones; polyether sulfones; polyether ketones; polyether imides, polyphenylene sulfides; polyarylene ester resins; polyesters; homopolymers or copolymers of N—H and/or N-alkyl glutarimide; acrylonitrile-butadiene-styrene resins ("ABS"); styrene-acrylonitrile resins ("SAN"); styrene-maleic anhydride resins ("SMA"); imidized SMA; and polyamides ("Nylons"). Mixtures of thermoplastic resins may also be used. Particularly useful thermoplastic resin mixtures include, for example: SAN-polyglutarimide, polycarbonate-polyester, PMMA-poly(vinylidene fluoride) and polystyrene-poly (phenylene oxide). Preferred resins for use in the process and apparatus of the present invention are: polycarbonates; linear acrylic homopolymers and copolymers; cyclic polyolefins; and linear imidized acrylic homopolymers and copolymers such as those described in U.S. Pat. No. 4,727,117 (Hallden-Abberton et al.) and U.S. Pat. No. 4,246,374 (Kopchik).

The plastic resins useful in the present invention typically result from addition polymerization or condensation polymerization processes. Addition polymerization processes include bulk polymerization and solution or dispersion polymerization in water or organic solvent media; such processes are well known in the art and may incorporate cationic, anionic, or free radical initiation and propagation reactions. Condensation polymerization processes include bulk, solution and dispersion polymerization processes. Plastic resins formed by polymerization processes other than bulk polymerization may require subsequent treatment in order to isolate the resin.

The following examples are presented to illustrate further various aspects of the present invention, but are not intended to limit the scope of the invention in any respect.

EXAMPLE 1

Preparation of Acrylic Film

This example illustrates the method of the present invention used to produce optical quality acrylic sheet.

PMMA resin having an average molecular weight of 110,000 was starve-fed into a 2 inch (5 cm) diameter single screw vented two-stage extruder having a 30:1 L:D ratio at a rate of 3.1 g/s using a volumetric feeder. The extruder barrel had a temperature profile from 204° C. at the feed end to 274° C. at the discharge end. The resin was devolatilized using a devolatilization vent operating at 720–750 mm Hg.

The screw was rotated at 30 rpm. A gear-type melt pump was used to pump the molten resin through a screen pack filter to a 12" (30 cm) long overflow die having a 1.27 cm diameter internal conduit and a series of 22 metering holes with a spacing of 1.27 cm. The diameter of the metering holes increased from the feed end of the die to the downstream end from 3.18 mm to 3.73 mm. The melt pump temperature was 274° C. The melt pump suction pressure was 2100 kPa. and the melt pump discharge pressure was approximately 4100 kPa. The overflow die was heated internally using three electric cartridge heaters and externally using three IR heating units to a temperature of 274° C. The molten web formed at the apex of the die was conveyed using two pairs of tank treads, and cooled using cooled forced air which was applied using two air plenums.

The resultant sheet had average thickness of 0.325 mm, surface roughness Rq of 14.6 nm and an optical retardance of <5 nm.

EXAMPLE 2

Preparation of Imidized Acrylic Sheet

This example illustrates the method of the present invention used to produce optical quality imidized acrylic sheet.

A capped imidized acrylic resin having an weight average molecular weight of 108,000 and a glass transition temperature of about 180° C. was starve-fed into a 2 inch (5 cm) diameter single screw vented two-stage extruder having a 30:1 L:D ratio at a rate of 2.5 g/s using a gravimetric feeder. The extruder barrel had a temperature profile from 246° C. at the feed end to 329° C. at the discharge end. The resin was devolatilized using a devolatilization vent operating at 720–750 mm Hg. The screw was rotated at 30 rpm. A gear-type melt pump was used to pump the molten resin through a screen pack filter to a 25.5 inch (65 cm) long overflow die with a 1.588 cm diameter internal conduit and a 16 inch (40 cm) long slot tapering from 0.038 to 0.042 inch (0.965 to 1.067 mm). The melt pump temperature was 329° C. The melt pump suction pressure was approximately 4100 kPa. The melt pump discharge pressure was approximately 1650 kPa. The die was heated using a hot oil system (oil temperature =343° C.) via internal holes in the die, and the air around the die was heated with a forced-air oven (temperature =280° C.). The molten web formed at the apex of the die was conveyed using two pairs of tank treads operating at a speed of 1.2 cm/s, and cooled by natural convection of room air.

A 200 mm×200 mm piece was cut from the cooled sheet and tested. The resultant sheet had a thickness of 0.390 mm, with a variation of ±0.015 mm. The surface waviness Wy and Wq were <0.5µ and 0.18µ respectively, surface roughness Rq was 7.6 nm, and the optical retardance was <6 nm. The thermal shrinkage, measured at a temperature of 160° C., was 0.03% or less.

EXAMPLE 3

Preparation of Polycarbonate Sheet

This example illustrates the method of the present invention used to produce optical quality polycarbonate sheet.

Extrusion-grade polycarbonate resin (GE Lexan 101) was starve-fed into a 2 inch (5 cm) diameter single screw vented two-stage extruder having a 30:1 L:D ratio at a rate of 4.4 g/s using a gravimetric feeder. The extruder barrel had a temperature profile from 232° C. at the feed end to 315° C. at the discharge end. The resin was devolatilized using a devolatilization vent operating at 720–750 mm Hg. The screw was rotated at 30 rpm. A gear-type melt pump was used to pump the molten resin through a screen pack filter to a 37.5 inch (95 cm) long overflow die with a 1.905 cm diameter internal conduit and a 28 inch (71 cm) long slot tapering from 0.038 to 0.045 inch (0.965 to 1.143 mm). The melt pump temperature was 315° C. The melt pump suction pressure was approximately 3400 kPa. The melt pump discharge pressure was approximately 1300 kPa. The die was heated using a hot oil system (oil temperature =315° C.) via internal holes in the die, and the air around the die was heated with a forced-air oven (temperature =260° C.). The molten web formed at the apex of the die was conveyed using two pairs of tank treads operating at a speed of 1.2 cm/s, and cooled by natural convection of room air.

A 400 mm×400 mm piece was cut from the cooled sheet and tested. The resultant sheet had an average thickness of 0.43 mm, with a variation of ±0.02 mm in both the transverse and machine directions. Wy was <1µ, Wq was 0.15µ, the surface roughness Rq was <10 nm, and the average optical retardance was 20 nm with a variation of 10 nm. Thermal shrinkage, measured at 130° C., was 0.02%.

EXAMPLE 4

Preparation of Polycarbonate Film

This example illustrates the method of the present invention used to produce optical quality polycarbonate film.

Extrusion-grade polycarbonate resin (GE Lexan 101) was starve-fed into a 2 inch (5 cm) diameter single screw vented two-stage extruder having a 30:1 L:D ratio at a rate of 2.5 g/s using a gravimetric feeder. The extruder barrel had a temperature profile from 232° C. at the feed end to 315° C. at the discharge end. The resin was devolatilized using a devolatilization vent operating at 720–750 mm Hg. The screw was rotated at 30 rpm. A gear-type melt pump was used to pump the molten resin through a screen pack filter to a 37.5 inch (95 cm) long overflow die with a 1.905 cm diameter internal conduit and a 28 inch (71 cm) long slot tapering from 0.038 to 0.045 inch (0.965 to 1.143 mm). The melt pump temperature was 315° C. The melt pump suction pressure was approximately 3400 kPa. The melt pump discharge pressure was approximately 1300 kPa. The die was heated using a hot oil system (oil temperature 315° C.) via internal holes in the die, and the air around the die was heated with a forced-air oven (temperature =250° C.). The molten web formed at the apex of the die was conveyed using two pairs of tank treads operating at a speed of 3.1 cm/s, and cooled by natural convection of room air.

A 400 mm×400 mm piece was cut from the cooled sheet and tested. The resultant film had an average thickness of 54µ, with variation ±4µ in both the transverse and machine directions, and an optical retardance of <10 nm.

Test Methods

The following test methods were used to test the sheets made in the Examples above. It is understood in the art that these test methods are exemplary in nature, and that the results are not method-dependent.

Optical Retardance

The retardance of light at 632.8 nm wavelength was determined in the following manner. A polarized laser beam (polarized at −45° with respect to the laboratory frame) was passed through the plastic sheet, and then through a photoelastic modulator (PEM) (Model PEM-90, Hinds Instruments, Inc.; Hillsboro, Oreg.) oriented with optical axis set to 0° in the lab frame. The PEM voltage was set at ¼ wave retardance (158.2 nm). The light then was passed through a second linear polarizer (polarization axis +45° C.) and intensity detected by a silicon diode detector (Model PDA-50, ThorLabs Inc.; Newton, N.J.). The PEM and detector were modulated, and the signal from the detector processed by a lock-in amplifier (Model 5210, E G & G Princeton Applied Research; Princeton, N.J.). The plastic sheet was rotated perpendicular to the laser beam to find the maximum signal. The retardance was determined by comparing the maximum signal to that measured Standard ¼ wave plate.

Birefringence of a material can be obtained by dividing the optical retardance of a material by its thickness. For example, if the optical retardance for a 0.4 mm thick sheet of plastic is 4 nm, the birefringence of the materials is 0.00001. For optical quality plastic sheet made by the method of the present invention, birefringence of a material is considered to be low if it is ≦0.0002, preferably ≦0.00005, and most preferably ≦0.00001.

Sheet Waviness

Sheet waviness (Wy and Wq) was measured using a stylus profiler (Surfanalyzer System 5000, Federal Products; Providence, R.I.) with a procedure similar to that of SEMI Standard D15-1296. The measured profile was digitally filtered with a Gaussian long wavelength cutoff (8 mm). Wy is the difference between maximum and minimum values in an 20 mm sampling length, and Wq is the root mean square average deviation of the filtered profile from the mean line calculated over 8 mm, and averaged over a 80 mm evaluation length. For optical quality sheet produced by the method of the present invention, Wy should be ≦1.0µ, preferably ≦0.2µ, and most preferably ≦0.05µ.

Sheet Roughness

Sheet roughness (Rq) was measured using a stylus profiler (Dektak 3–30, Veeco/Sloan; Santa Barbara, Calif.) with a procedure similar to that of SEMI Standard D7-94. The measured profile was digitally filtered with a Gaussian long wavelength cutoff (0.08 mm) and a short wavelength cutoff (0.0025 mm). The evaluation length was 0.4 mm. The roughness parameter (Rq) is the root mean square average deviation of the filtered profile from a mean line. The average value from three different measurements was reported. For optical quality sheet produced by the method of the present invention, Rq should be ≦50 nm, preferably ≦10 nm, and most preferably ≦5 nm.

Shrinkage

Shrinkage was determined by directly measuring the sample length before and after heat treatment. Multiple measurements were made to determine the length of a dry piece of plastic. The accuracy of the measurement was 0.005%. The sample was heated to a set temperature below its $T_g$ for 4 hours. Upon cooling to room temperature, the length was again determined by multiple measurements. The percentage change in length before and after the heating cycle was reported as the shrinkage. For optical quality sheet produced by the method of the present invention, the shrinkage should be ≦0.05%, preferably ≦0.02%, and most preferably ≦0.005%.

What is claimed is:

1. A method for producing high quality plastic sheet, comprising the steps of:

a) providing molten plastic resin;

b) directing the molten plastic resin to an overflow die having an inlet, an outlet, an overflow surface formed by the exterior and a pair of die lips, two exterior sides connected to the overflow surface and an apex formed by the confluence of the two exterior sides and located in substantial opposition to the overflow surface;

c) shaping the molten plastic resin into a molten web wherein the molten plastic resin exits the overflow die through the outlet, flows around the two exterior sides and converges at the apex form the molten web;

d) guiding said molten web away from said overflow die by a takeoff means; and e) cooling said molten web to form a solid sheet, wherein only outer edges of the molten web are contacted by the takeoff means.

2. The method of claim 1 wherein the source of molten plastic resin is provided by extrusion.

3. The method of claim 1 wherein the resin is a thermoplastic resin selected from the group consisting of: homopolymers or copolymers of acrylic acid, methacrylic acid and their esters; phenoxy ethers; polyphenylene oxide resins, epoxy resins; cellulosic resins; vinyl polymers; fluoropolymers; polycarbonates; polystyrenes; polyolefins; polysulfones; polyether sulfones; polyether ketones; polyether imides, polyphenylene sulfides; polyarylene ester resins; polyesters; homopolymers or copolymers of N—H and/or N-alkyl glutarimide; acrylonitrile-butadiene-styrene resins; styrene-acrylonitrile resins; styrene-maleic anhydride resins; imidized styrene-maleic anhydride; polyamides; and mixtures thereof.

4. The method of claim 3, wherein the thermoplastic resin is selected from the group consisting of: polycarbonates; linear acrylic homopolymers and copolymers; cyclic polyolefins; and linear imidized acrylic homopolymers and copolymers.

5. The method of claim 3 wherein the copolymers of acrylic acid, methacrylic acid and their esters comprise acrylic acid, methacrylic acid or their esters copolymerized with styrene and its derivatives, N-alkyl maleimides, acrylonitrile, or vinyl acetate.

6. The method of claim 3, wherein the thermoplastic resin is a mixture of resins selected from the group consisting of: styrene-acrylonitrile-polyglutarimide, polycarbonate-polyester, polymethylmethacrylate-poly(vinylidene fluoride) and polystyrene-poly(phenylene oxide).

7. The method of claim 1 wherein the takeoff means is a tread.

8. The method of claim 1 wherein the overflow die has a smooth surface.

9. The method of claim 1 wherein the solid sheet has a thickness variation over a 400 mm length of 10% or less.

* * * * *